Jan. 20, 1931.   H. E. WALKER   1,789,506
HYDRAULIC TRANSMISSION MECHANISM
Filed July 30, 1927    2 Sheets-Sheet 1
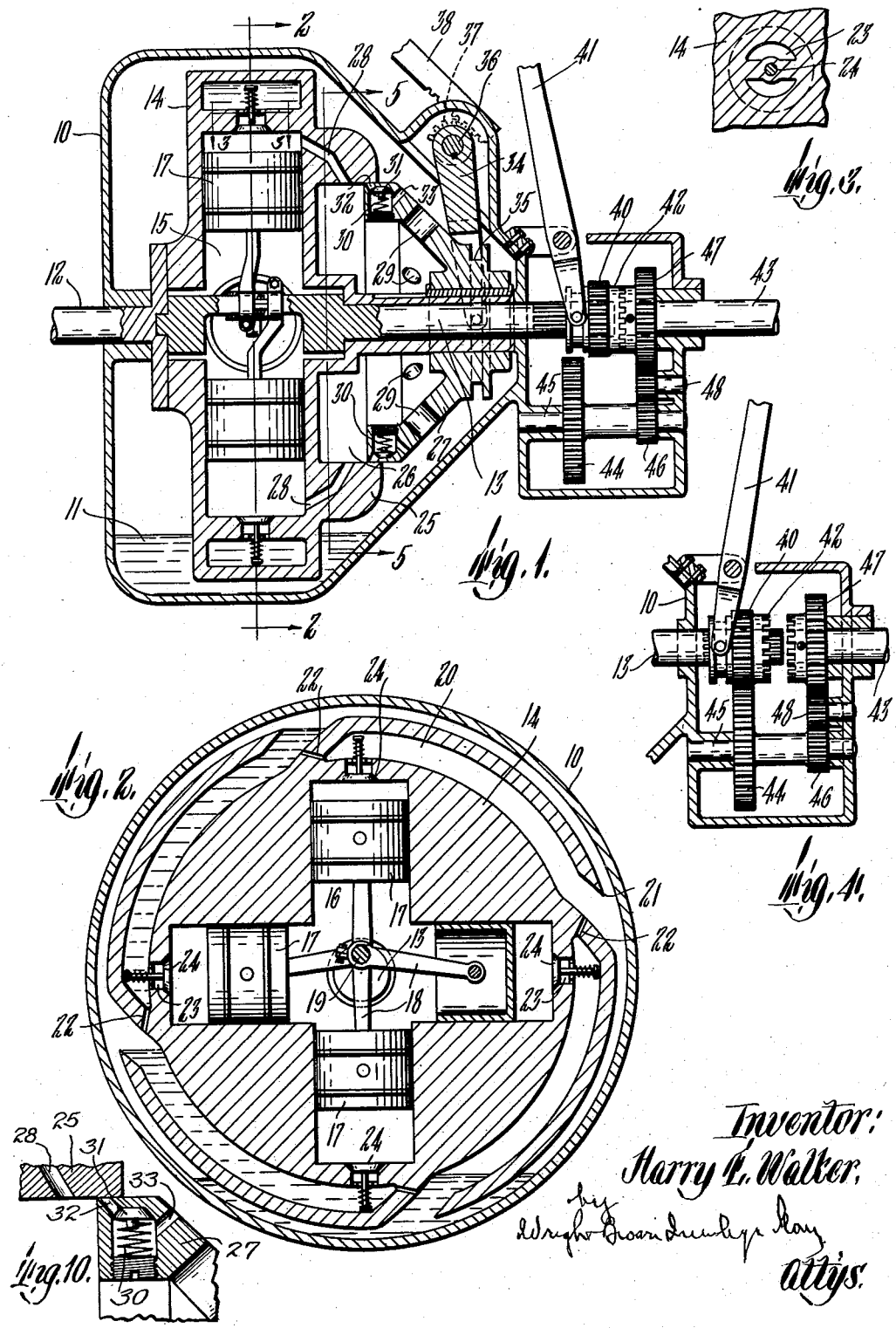
Inventor:
Harry E. Walker,
by
attys.

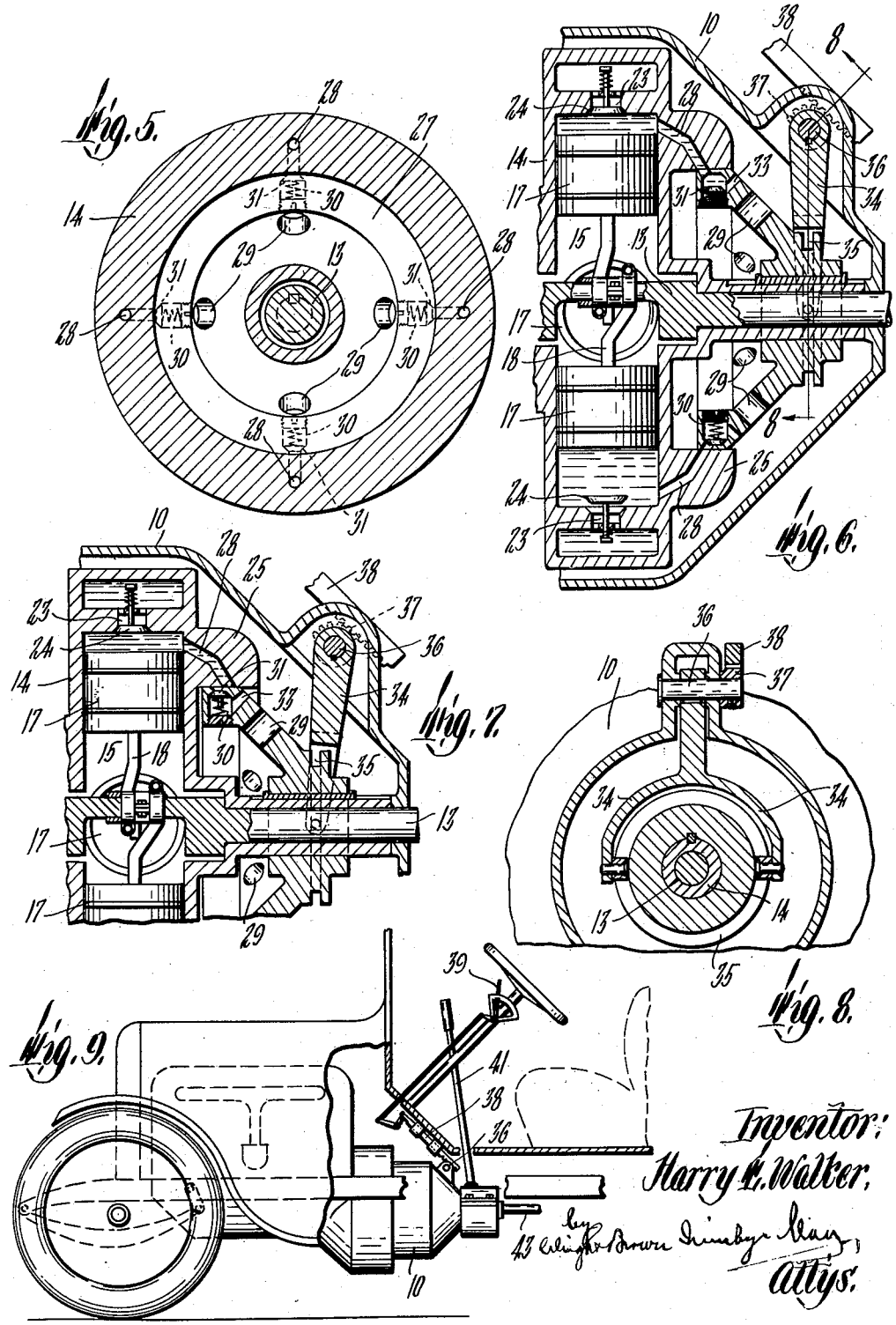

Patented Jan. 20, 1931

1,789,506

UNITED STATES PATENT OFFICE

HARRY E. WALKER, OF FAIRFIELD, MAINE

HYDRAULIC TRANSMISSION MECHANISM

Application filed July 30, 1927. Serial No. 209,541.

This invention relates to transmission mechanism by which a driving shaft may be operatively connected to a driven shaft in such a manner that the driving shaft may be rotated at a constant speed while the speed of the driven shaft may be varied at will from rest to that of the driving shaft. My improved transmission mechanism comprises apparatus for opposing a variable resistance to the flow of a fluid contained in the mechanism, such flow being caused by relative rotation of the driving and driven shafts. Various advantageous features of construction will be apparent to one skilled in the art from the disclosure of my invention in the following description, and on the drawing of which,—

Figure 1 shows the mechanism in longitudinal section.

Figure 2 is a transverse section on the line 2—2 of Figure 1.

Figure 3 is a fragmentary section on the line 3—3 of Figure 1.

Figure 4 shows the reversing gearing of Figure 1 in a different position of operation.

Figure 5 is a section on the line 5—5 of Figure 1.

Figures 6 and 7 show a portion of the transmission mechanism illustrated in Figure 1 in different positions of operation.

Figure 8 is a section on the line 8—8 of Figure 6.

Figure 9 is a fragmentary elevation of the apparatus as installed in a conventional automobile.

Figure 10 is a fragmentary section of a portion of the mechanism shown in Figure 1.

Referring to the drawing in detail, the transmission apparatus is preferably enclosed in a fluid-tight casing 10 which contains a suitable pool 11 of oil or other liquid for operating the mechanism. It is not necessary that the casing be filled with oil, a relatively small quantity being sufficient for the operation of the transmission mechanism. A driving shaft 12 from the motor or other prime mover enters the casing 10 at one end thereof, a driven shaft 13 emerging from the other end thereof and preferably arranged coaxially with the driving shaft. Fixed to the end of the shaft 12 is a body member 14 which is preferably made with a central chamber 15 from which extend radially suitable bores or chambers 16, four of which are shown in the embodiment illustrated on the drawing, but there may be more or less of these as desired. Slidably fitted in each bore 16 is a piston 17, each of the pistons being connected as by a connecting rod 18 to a crank 19 formed on the driven shaft 13. The body member 14 is preferably provided with a series of scoops extending around its periphery. These scoops are formed by elongated arcuate recesses 20 which extend beneath the outer surface of the body member 14, the inner ends of the recesses 20 being near the outer ends of the bores 16, while at their opposite ends the recesses open to the surface of the body member 14 at points angularly spaced from the corresponding bores 16. As the body member rotates with the driving shaft 12, the lips 21 formed by the openings of the recesses 20 scoop up oil from the pool 11, the oil thus scooped up passing by reason of its inertia to the closed ends of the recesses. These closed ends are provided with small vents 22 to permit the escape of air which would otherwise be trapped by the inflow of oil. In this way, the inner ends of the recesses 20 are normally kept filled with oil during the rotation of the shaft 12 and body member 14. The recesses 20 are connected at their inner ends with corresponding bores 16 by ports 23 which are normally closed as by one-way spring-loaded valves 24 which are arranged to permit the inflow of oil from the recesses 20 to the bores 16, but to prevent flow in the opposite direction. The body member 14 is also provided with a rearward extension 25 in which is a cylindrical recess 26, the extension 25 and the recess 26 being coaxial with the shafts 12 and 13. A cap member 27 is provided to fit slidably in the recess 26 and to form therewith a chamber which may be connected with the several bores 16 as by suitable passages 28 leading from the outer ends of the bores to the sides of the recess 26 on which the cap 27 slides. The cap 27 is preferably supplied with a plurality of ports 29 which at all times allow free communication between the recess 26 and the interior of the casing 10. The forward rim of the cap 27 is formed with ports to cooperate with each of the passages 28. These ports comprise a bore 30 adapted to receive a spring-pressed valve 31 which normally closes a passage 32 opening radially outward from the cap and adapted to register with one of the passages 28 when the cap is moved forwardly. A discharge pipe 33 also communicates with the bore 30. As may be seen from Figure 1, which shows the mechanism in "neutral" position, when the driving shaft 12 and body member 14 are rotating, the pistons 17 being eccentrically connected to the driven shaft 13 will reciprocate in their ports 16 as there is nothing to oppose their reciprocating motion when the mechanism is in neutral position as shown in Figure 1. In this position, the passages 28 are open and as the pistons 17 reciprocate, air is freely sucked into and discharged from the bores 16 through the passages 28. Thus no motion is imparted to the driven shaft 13 while the passages 28 are unobstructed. In order to start the rotation of the shaft 13, the cap 27 is moved forwardly until its forward edge moves partly over the orifices of the passages 28. This diminishes the free cross section of these passages and opposes a light but increasing resistance to the reciprocating motion of the pistons 17 as the cap 27 is moved forwardly. As long as air can be drawn in and discharged through the passages 28, practically no oil will be drawn into the cylinders through the valves 24. When, however, the ports 32 are brought into registry with the passages 28, the one-way valves 31 prevent the ingress of air into the bores 16 so that the reciprocating pistons thereupon draw oil into the bores through the ports 23 and discharge the oil through the ports 32, 33. Due to the viscosity of the oil and the spring-loading of the valves 24 and 31, a certain amount of resistance is thus opposed to the reciprocation of the pistons 17, which resistance is translated into torque applied through the crank 19 to the shaft 13. Further forward motion of the cap 27 diminishes the opening between the passages 28 and the ports 32 until the passages 28 are completely closed when the cap reaches its extreme forward position. At this time, the oil, which has been drawn into the bores 16, is trapped therein and being incompressible entirely prevents any reciprocation on the part of the pistons 17, the result being that the driven shaft 13 rotates at the same speed as the driving shaft 12. In order to control the sliding movement of the cap 27, I may provide a suitable fork 34, the ends of which engage in a peripheral slot 35 in the collar. The fork may be fixed to a rock shaft 36 which may extend through the casing 10, the outer end having a pinion 37 fixed thereto and arranged to mesh with a rack 38 which in turn may be operated by suitable linkage from a handle 39 mounted in any convenient position, such for example as illustrated in Figure 9. Since the resistance of the cap to sliding movement is negligible, the cap may readily be moved by manipulation of the lever 39 with the fingers. If preferred, however, the rack 38 may be operated by suitable connection with a foot pedal, not shown.

The driven shaft 13 is preferably connected to the vehicle wheels through a reversing gear illustrated in Figures 1 and 4. This may comprise a sliding gear 40 splined to the shaft 13 and slidable by means of an operating lever 41. The gear on its rear end face is preferably supplied with projections 42 which are arranged to engage with similar projections mounted on the transmission shaft 43, so that when the parts are as shown in Figure 1, the shaft 13 is directly connected to the shaft 43. In order to reverse the rotation of the shaft 43, the gear 40 may be slid forward so that the projections 42 are disengaged from the shaft 43 and the gear 40 is brought into meshing relation with a gear 44 mounted on a shaft 45 which also carries a gear 46 which is connected with a gear 47 mounted on the shaft 43 through an intermediate pinion 48 which meshes with both. When the gear 40 is in mesh with the gear 44, it will be seen that the connection through the gear train 46, 48, 47, will produce a reverse rotation of the shaft 43. Thus the fluid transmission mechanism can be utilized for varying speeds of driving both in the forward direction and in reverse, the motor being maintained constantly at its most economical and efficient speed.

Having thus described certain embodiments of my invention, it should be evident to those skilled in the art that various changes and modifications may be made therein without departing from its spirit or scope as defined by the appended claims.

I claim:—

1. In combination, a driving shaft, a driven shaft, and means for operatively connecting said shafts, said means comprising a body member fixed to one of said shafts for rotation therewith, said body member having a hollow center with bores extending radially therefrom and closed at their outer ends, a circular series of recesses in the peripheral portion thereof forming scoops with lips at the periphery of said body member and ports connecting said bores with said recesses, pistons slidably fitted in said bores, a crank on the other of said shafts, connecting rods operatively connecting said pistons to said crank, said body member also having normally unobstructed ports extending from said bores adjacent the outer ends thereof, and means movable to place yielding obstructions over said ports and further movable to close said ports.

2. In combination, a driving shaft, a driven shaft, and means for operatively connecting said shafts, said means comprising a body member fixed to one of said shafts for rotation therewith, said body member having a hollow center, radially extending bores closed at their outer ends, and an inlet and an outlet port opening into each bore adjacent the outer end thereof, said outlet ports being normally unobstructed, a spring-loaded valve in each said inlet port, a spring-loaded valve movable over each outlet port, and means for closing said outlet ports.

3. In combination, a driving shaft, a driven shaft, and hydraulic power-transmission mechanism operatively connecting said shafts, said mechanism comprising a body member fixed to one of said shafts and having bores extending radially therefrom, a piston slidably fitted in each bore, each said piston forming a chamber with the outer end portion of its bore, said body member being provided with ports extending from said chambers through said member, and means cooperating with said ports and actuable to permit inflow and outflow of air or of oil or of neither into and out of said chambers.

In testimony whereof I have affixed my signature.

HARRY E. WALKER.